3,100,216
ALKYLATION OF FERROCENE
Norman Alpert, Poughkeepsie, and James M. Caffrey, Jr., Beacon, N.Y., Harold J. Watson, Danville, Va., and Herbert E. Vermillion, Wappingers Falls, N.Y., assignors to Texaco Inc., a corporation of Delaware
No Drawing. Filed July 3, 1958, Ser. No. 746,323
3 Claims. (Cl. 260—439)

This invention relates to a process for preparing aliphatic-substituted iron biscyclopentadiene compounds which are more commonly termed alkyl ferrocenes. The alkylation process of this invention provides a simple method for preparing a wide variety of ferrocene compounds.

Biscyclopentadienyl iron, hereafter called ferrocene, is a stable compound having a molecular sandwich-type configuration. It is believed that hybrid coordinate covalent bonds between the nuclear carbon atoms of each ring and the iron atom contribute to ferrocene's stability.

Ferrocene, which is an effective anti-knock agent, is prepared by a Grignard synthesis involving the preparation of a cyclopentadiene Grignard reagent and its reaction with ferric chloride. Aliphatic-substituted ferrocenes can be prepared by a modification of this reaction involving the preparation of an aliphatic-substituted cyclopentadiene Grignard reagent and its reaction with ferric chloride. The process of this invention provides a novel method for preparing aliphatic hydrocarbon-substituted ferrocene derivatives.

In accordance with the process of this invention, ferrocene compounds containing one to eight aliphatic hydrocarbon groups are prepared by reacting ferrocene in the liquid phase with an alkylating agent in the presence of a Friedel-Crafts catalyst at a temperature below 100° C. The alkylation reaction is advantageously effected in a ferrocene solvent which is inert to the action of the Friedel-Crafts catalyst; carbon disulfide, nitrobenzene and nitroparaffins are examples of solvents advantageously employed in the invention.

The discovery that ferrocene is successfully alkylated employing a Friedel-Crafts catalyst is indeed surprising in view of the persence of the iron atom in its structure. Contrary to expectation, alkylation of ferrocene proceeds smoothly employing Friedel-Crafts catalysts when the reaction conditions of this invention are maintained.

The Friedel-Crafts group of catalysts is well known in the art and comprises hydrogen fluoride, boron fluoride, hydrogen fluoride-boron fluoride combinations, aluminum chloride, aluminum bromide, stannic chloride, titanium chloride, and other metallic halides. Advantageously, the catalysts for use in the process of this invention are hydrogen chloride, boron chloride, hydrogen chloride-boron fluoride, and aluminum halides. The preferred catalyst is an aluminum halide catalyst, and particularly preferred is aluminum chloride.

Ferrocene is alkylated by the process of this invention to produce ferrocene compounds containing one to eight aliphatic substituents. The usual products of the alkylation process of this invention are mono-, di-, tri- and tetra-substituted ferrocenes, since further substitution requires more stringent reaction conditions, for example, longer contact time. The process of this invention provides a better and more economical method of preparing alkyl and alkenyl ferrocenes than the previously described procedure involving the preparation of an alkyl cyclopentadiene Grignard compound and its subsequent reaction with iron chloride.

Useful alkylating agents for our process comprise the well known group of compounds used in ordinary Friedel-Crafts alkylation reactions. This group includes olefins, diolefins, alcohols, esters, and alkyl halides. Use of alkyl halides and olefins is advantageous for the purpose of the instant process. The preferred alkylating agents are those selected from the group consisting of secondary alkyl halides and tertiary alkyl halides, e.g., tertiary butyl chloride and isopropyl bromide. Other useful alkyl halides are the lower (having 1–8 carbon atoms) alkyl halides, e.g., normal butyl chloride and 2-chloro n-butane. The useful olefins can be any of the normally gaseous or normally liquid olefins or mixtures thereof, e.g. propylene, a butylene, ethylene, an amylene, $C_4$ polymers such as di-isobutylene and tri-isobutylene, mixed or non-selective $C_3$–$C_4$ polymers and various fractions of cracked or synthetic gasoline or polymer naphtha, etc., the lower (having not more than 8 carbon atoms) olefins being the particularly suitable ones. Also usable in the process of the invention are diolefins such as a butadiene and various alcohols such as ethyl alcohol, propyl alcohol, t-butyl alcohol, cyclohexanol, and alkyl esters such as alkyl halides, sulfates, and phosphates.

It is necessary to maintain the temperature during the alkylation below 100° C. and preferably below 50° C. in the alkylation process of the invention to avoid side reactions which result in the formation of tarry products. The alkylation is usually effected at room temperature, that is, about 25° C. or below, and the temperature is normally maintained between 0 and 25° C. during the addition of reagents.

The alkylation is usually effective at atmospheric pressure, but subatmospheric and superatmospheric pressures are used without any adverse effect on the reaction. Superatmospheric pressures up to about 200 p.s.i.g. or higher are usually employed if a gaseous alkylating agent, such as ethylene or propylene, is employed.

Mol ratios of ferrocene to alkylating agent between 0.1 and 5 are usually employed. When an olefin or an alkyl halide is the alkylating agent, mol ratios of ferrocene to alkylating agent between 0.1 and 3 are preferred.

The mol ratio of catalyst to alkylating agent is usually in the range of 0.2 to 8, depending upon the particular Friedel-Crafts catalyst used. With a solid catalyst such as aluminum chloride, the mol ratio of catalyst to alkylating agent is usually in the lower portion of the prescribed range, that is, between about 0.2 and 2, while with a liquid catalyst, such as HF, the mol ratio is usually in the upper portion of the range, that is, between about 3 and 8.

For the production of mono- to tetra-substituted ferrocenes, contact times of about 0.1 to 1 hour have proven effective. For the production of more highly substituted derivatives, longer contact times, for example, 1 to 2 hours, are required.

The alkylation reaction of the invention is usually effected in the presence of a solvent which is substantially inert under reaction conditions. Solvents which may be used include carbon disulfide, nitroparaffins such as nitromethane, nitrobenzene and non-reactive hydrocarbons such as n-hexane. Carbon disulfide and nitrobenzene are the solvents which find most extensive application in the process of the invention. The amount of solvent used can vary between 0.5 to 10 volumes of solvent per volume of alkylating agent; even higher solvent-alkylating agent ratios can be used, but they are not feasible for commercial operation because they only compound the problem of solvent recovery.

A more complete understanding of the invention may be derived from the following examples which illustrate a preferred method of utilizing the invention.

*Example I*

13.4 g. of anhydrous aluminum chloride was added to a solution of 9.3 g. of ferrocene in 150 ml. of carbon disulfide. A solution of 9.3 g. of t-butyl chloride in 25 ml. of carbon disulfide was added dropwise while the mixture was kept at 10 to 15° C. After addition of butyl chloride was complete, the mixture was left at room temperature for an hour, refluxed for about one-half hour and poured into a mixture of about 100 g. of ice and 10 ml. of concentrated hydrochloric acid. After stirring this mixture for about 15 minutes, the water layer was separated and subjected to successive extraction with 100 ml. of benzene and 100 ml. of pentane. The benzene and pentane extracts were combined with the hydrocarbon phase of the reaction product and the whole mixture vacuum stripped after it had been dried with anhydrous calcium chloride. The residue of the vacuum stripping operation was distilled at 1 mm. to yield 0.7 g. of a forerun distilling at 100 to 105° C., 5.1 g. of a fraction boiling at 105 to 117° C. and 2.9 g. of residue. The forerun contained ferrocene crystals. The fraction boiling at 105 to 117° C., which was mainly di-t-butyl ferrocene, was a red liquid having an R.I. at 25° C. of 1.5625. Quantitative analysis of the product gave 71.3 percent carbon, 8.3 percent hydrogen and 20.0 percent iron, which compares favorably with the theoretical for di-ti-butyl ferrocene, namely, 72.6 percent carbon, 8.7 percent hydrogen and 18.7 percent iron.

The usefulness of this product as an anti-knock agent was shown by adding various concentrations thereof to a naphtha fraction. In the following table, there is shown the octane improvement resulting from the incorporation of various concentrations of di-t-butyl ferrocene in a naphtha fraction.

| Composition: | Research Octane No. |
|---|---|
| Naphtha | 79.4 |
| Naphtha+1.00 g. di-t-butyl ferrocene/gal | 82.5 |
| Naphtha+1.98 g. di-t-butyl ferrocene/gal | 83.4 |
| Naphtha+2.94 g. di-t-butyl ferrocene/gal | 84.0 |

*Example II*

28 g. of anhydrous aluminum chloride was added to a solution of 18.6 g. of ferrocene in 500 ml. of carbon disulfide. 25 g. of isopropyl bromide was added slowly with stirring at room temperature. The mixture was refluxed for 24 hours and hydrolyzed by pouring into a mixture of ice and concentrated hydrochloric acid. The oil phase was separated, washed, dried with anhydrous calcium chloride and vacuum stripped of solvent. The residue was vacuum distilled at 15 to 17 mm. to yield about 4.7 g. of di-isopropyl ferrocene distilling at 142 to 175° C. This fraction had an R.I. $n_D^{20}$ of 1.5565. Incorporation of this product in naphtha effected an octane improvement approximately equivalent to that effected by di-t-butyl ferrocene.

This application is a continuation-in-part of our copending patent application Serial No. 574,065, filed on March 27, 1956, and now abandoned, entitled "Alkylation of Ferrocene," which copending patent application is itself a division of the like-entitled and also copending patent application Serial No. 414,892, filed on March 8, 1954, and now abandoned.

We claim:

1. The process for preparing alkylated ferrocene which comprises reacting ferrocene with an alkyl halide selected from the group consisting of secondary alkyl halides and tertiary alkyl halides containing up to 8 carbon atoms in the liquid phase in the presence of an aluminum halide Friedel-Crafts catalyst at a temperature below 100° C.

2. The process of claim 1 wherein the alkyl halide is tertiary butyl chloride.

3. The process of claim 1 wherein the alkyl halide is isopropyl bromide.

References Cited in the file of this patent

UNITED STATES PATENTS 2,831,879  Weinmayr _____ Apr. 22, 1958

OTHER REFERENCES

Woodward et al.: J.A.C.S., vol. 74, pp. 3458–3459 (1952).

Groggins: Unit Processes in Organic Synthesis, 4th Ed., pp. 846 to 850 (1952).

Rosenblum: Thesis on Ferrocene, Harvard Univ. Library, Feb. 19, 1954, p. 35.